May 14, 1968   E. BADER ET AL   3,383,448
POLYMERIZATION PROCESS
Filed May 4, 1964
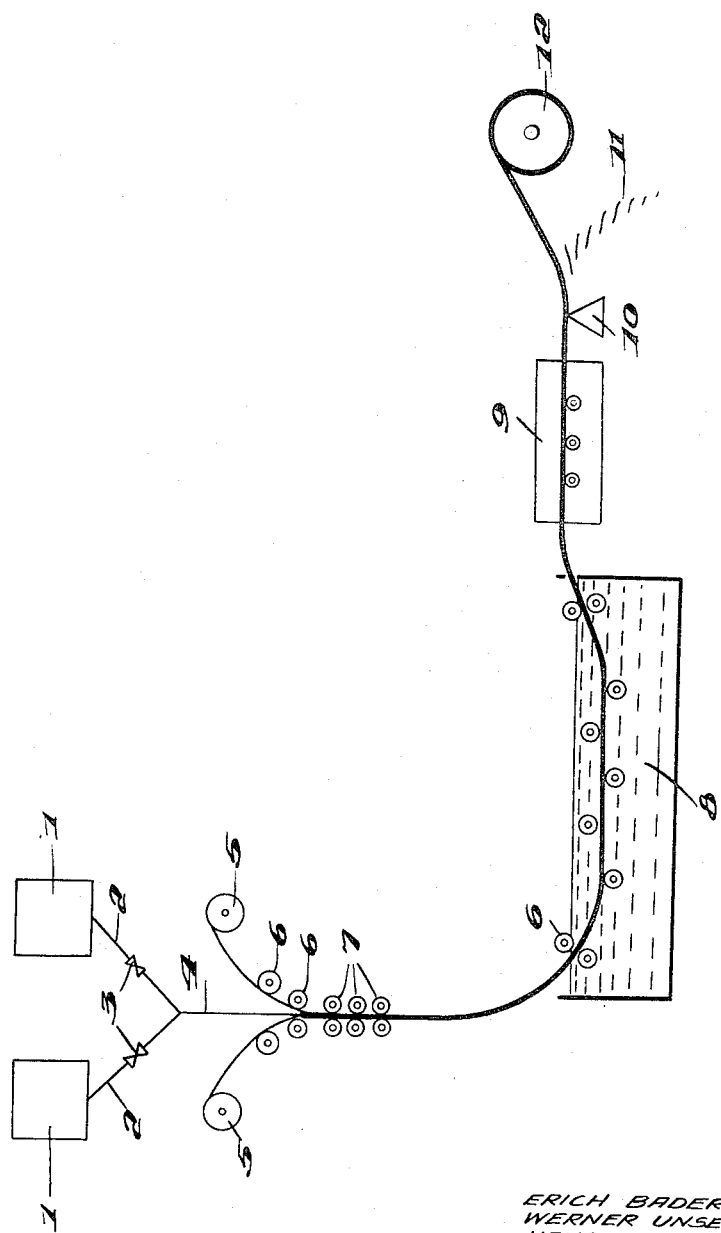
INVENTORS
ERICH BADER,
WERNER UNSELD,
HANS LANDSFELD,
GERHARD MORLOCK,
BY *Bailey, Stephens & Huettig*
ATTORNEYS

United States Patent Office 3,383,448
Patented May 14, 1968

3,383,448
POLYMERIZATION PROCESS
Erich Bäder, Hanau am Main, Werner Unseld, Niederrodenbach, Hans Landsfeld, Hanau am Main, and Gerhard Morlock, Gross-Auheim, Germany, assignors to Deutsche Gold- und Silber-Scheideanstalt vormals Roessler, Frankfurt am Main, Germany
Filed May 4, 1964, Ser. No. 364,597
Claims priority, application Germany, May 4, 1963, D 41,489; Dec. 3, 1963, D 43,076
4 Claims. (Cl. 264—214)

ABSTRACT OF THE DISCLOSURE

Method for the continuous bulk polymerization of a polymerizable mass comprising a material selected from the group consisting of polymerizable monomers having a terminal $CH_2=C<$ group and mixtures thereof while excluding molecular oxygen comprising continuously introducing the polymerizable mass into a tube shaped synthetic resin structure while at least practically completely displacing all air in such tube and continuously passing the thus filled tube through a polymerization zone maintained at the polymerization temperature required for the polymerizable mass until the polymerization has been effected. The preferred synthetic resin for said tube shaped structure is polyethylene and preferably the filled shape tube shaped structure is substantially flattened out as it is passed through the polymerization zone.

---

The present invention relates to an improved process for the continuous polymerization of vinyl compounds, as well as their substitution products, especially, methyl methacrylate and other lower alkyl esters of acrylic and methacrylic acid.

It is known that monomeric compounds containing ethylenic unsaturation, such as methyl methacrylate, can be polymerized in molds. In particular, glass molds have been used for these purposes. These also can, when in the form of flat chambers, be used for the direct production of plates. The disadvantages engendered by the use of glass molds are well known.

The use of polyethylene molds for the production of shaped structures is also known. The inner surfaces of such molds are very smooth and the molds are so elastic that the release from the molds is easily accomplished. On the other hand, the long polymerization periods, even with normally highly active catalysts, required are of disadvantage. Often a complete cure or hardening cannot be achieved as polyethylene is permeable to air and oxygen. In order to avoid this disadvantage, the polyethylene molds have been rendered non-permeable to air by application of lacquer coatings. Copolymers or graft polymers have already also been used for this purpose. In both instances, however, an additional cost is involved. In addition, processes of this type which can be carried out continuously have previously not been known.

It is furthermore known that the raw materials for injection molding, extrusion molding and lacquers can be produced by the polymerization of monomeric substances. However, bulk polymerization procedures have not achieved any widespread acceptance for this purpose. The primary reason therefore, evidently, resides in the fact that it is extraordinarily difficult to remove the heat of polymerization. In addition, it is very difficult to move the tough highly viscous masses which are formed. In addition, in the case of some polymers, especially in the case of polymethyl methacrylate, the melting points are very high and are very close to decomposition temperatures. On the other hand, the boiling points of the monomers are very low. A further difficulty in these processes is caused by the strong self-acceleration of the polymerization which occurs after the polymerization has reached a certain point (Trommsdorff effect) which causes still further difficulty in the heat removal. For this reason, bulk polymerization has in practice been replaced for a long time by suspension, emulsion or solution polymerization in which the mixtures to be polymerized are diluted with a solvent or water right from the start. Suspension polymerization has been especially widely accepted for the technical production of polymeric materials for injection molding, extrusion and lacquers.

According to the invention it was found that a continuous bulk polymerization of vinyl compounds, as well as their substitution products, especially methyl methacrylate or their mixtures, can be expediently effected with the aid of polymerization catalysts and, if desired, of accelerators and, if desired, with the exclusion of air or oxygen within hollow bodies of synthetic resins, if the material to be polymerized is continuously introduced into a tube shaped synthetic resin structure with practically complete displacement of air therein, and continuously passing the thus filled structure through a polymerization zone heated to the polymerization temperature, preferably, through a liquid bath heated to the polymerization temperature to effect the curing thereof and, if desired, subsequently passing it through a tempering zone. The polymers which are produced in this manner can after removal from the tubular structure and after they have been comminuted in a known manner be employed as an injection molding or an extrusion mass. The polymeric products thus produced distinguish themselves by their extraordinarily high purity so that further processing to practically colorless products is possible. A similar quality either could not be attained or only be attained at considerable expense in the products produced by the previously employed processes, such as, suspension polymerization. Previously, in order to obtain such purities, painstaking cleanliness was required not only with reference to the apparatus employed and the starting materials and water employed but also the air contained in the work rooms. In the process according to the invention the material to be polymerized is introduced into synthetic resin tubes and protected therein so that access to impurities is already precluded at a time when the material does not yet attract them. When the polymerization is effected in a liquid bath, preferably a water bath held at polymerization temperature, the polymerization inhibiting effect of the air or oxygen is completely avoided. Quick and very thorough curing is achieved. After completion of the polymerization and after the tempering, if desired, the polymerized product is removed from the tube and the material of the tube used for other uses or reused. It is possible to produce new webs for the production of fresh tubes without difficulty so that practically no waste occurs.

The process according to the invention solves the difficulty in handling and transporting the highly viscous masses which are formed during bulk polymerization in that the mass to be polymerized is continuously provided with a surrounding casing which continuously moves along with the mass during the polymerization and such casing is continuously removed after completion of the polymerization. It is of advantage if the filled tubes are passed through the polymerization zone in as flat a form as possible. In this way the problem of the rapid removal of the heat of polymerization is solved, especially when a liquid bath is employed in such polymerization zone. This naturally is the case when one works with thicknesses of only several mm. or at most several cm. It is possible in this way to carry out the polymerization more quickly and thereby attain higher velocities for the continuously moving material so as to increase the economy of the process. The process according to the invention therefore renders it possible to combine the advantages of bulk polymerization with the advantages of suspension polymerization without being subjected to the disadvantages of both procedures.

Vinyl compounds, such as styrene or acrylates, such as butyl acrylate, and their substitution products, such as esters of methacrylic acid, such as, for example, the preferred methyl methacrylate and butyl methacrylate, can be used as the materials to be polymerized. In addition, vinyl acetate and acrylonitrile may also be employed. Furthermore, mixtures of such materials can also be employed, such as, for example, of methyl methacrylate with acrylates, especially butyl acrylate, or with butyl methacrylate. Styrene or α methyl styrene can also be used as comonomers, the latter preferably in quantities less than 5%.

It usually is advantageous to start with solutions of polymers in monomers having a syrupy consistency. The polymeric component may be a polymer of the monomer employed, as well as a copolymer. Foreign polymers can also be used. When the monomeric substances polymerize alone with sufficient rapidity, the presence of a polymer can be omitted.

Preferably the starting material is in the form of a prepolymer (partial polymer) obtained, for example, by partial polymerization in a so-called single pot reaction in the presence of catalysts and, if desired, chain transfer agents.

When the products of the process according to the invention are to be used as injection molding, extrusion or lacquer materials, it is expedient to take care that the molecular weight of the polymers contained in the syrup and in the products of the process themselves correspond to those desired for the end use.

The known ionic and free radical forming catalysts for vinyl polymerization can be used in the usual quantities for the curing of the polymerizable masses according to the invention. Peroxidic compounds or their mixtures and also azo compounds have proved particularly suitable. The so-called redox catalysts are also suited.

It furthermore is possible to work in the presence of a cross-linking agent, but only if the resulting cross-linking is not disturbing in the further processing of the products produced according to the invention.

In carrying out the process according to the invention the catalyst can be admixed with the mass to be polymerized just before it is introduced into the tubular casing. If prepolymers are used the catalyst still remaining from their production can be used or supplemented. If rapidly acting catalyst systems are to be used the material to be polymerized can be divided into two portions and only such components of the catalyst system are admixed with each portion that each portion by itself possesses sufficient stability but that when such portions are admixed, a complete catalyst system causing rapid polymerization is provided. Such admixture, for example, can be effected by supplying the portions through separate conduits to a mixing head so that the mixture is formed just prior to its introduction into the tubular casing. The continuous introduction of the material into the tubular casing is carried out in such a way that all of the air therein is displaced practically completely. Preferably, a protective atmosphere is employed to assist in ensuring as complete exclusion of air or oxygen as possible. The filled casing is then passed through a polymerization zone, preferably, a liquid bath maintained at the polymerization temperature necessary. Instead of a liquid bath a heating flue, preferably, operated with a protective gas, such as nitrogen, can also be used in the polymerization zone. After the filled casing has been cured during the passage through the polymerization zone it may, if desired, also be passed through a tempering zone. Thereafter, the polymer is removed from the casing and, for example, comminuted. It also is possible to pass the filled casings through the polymerization zone in such a way and in such a form that shaped structures such as sheets or plates are produced directly. In principle, the polymer produced by the continuous process according to the invention can be processed to other desired products by conventional procedures.

Instead of admixing the catalyst or catalyst system with the material to be polymerized before the latter is introduced into the casing as described above, it is also possible to and sometimes very advantageous to apply the catalyst and/or accelerator or accelerator system to the inner surfaces of the tubular casing so that they are contacted with the material to be polymerized when it is introduced into the casing. The application of such catalyst and/or accelerator or accelerator system can be in the form of a solution or a paste shortly before the material to be polymerized is introduced.

As material for the tubular casing in which the polymerization according to the invention is caried out, polyethylene is most preferred. However, polypropylene as well as other synthetic materials, such as polyterephthalate, cellophane, polyvinyl alcohols cross-linked with formaldehyde or polyacrolein and fluorine containing resins can also be used.

The tubular structure for the casing can, for example, be produced by extrusion using an annular nozzle which is also provided with a central opening for the introduction of the material to be polymerized. However, an inert gas instead of air is required for blowing the tube. This method of tube formation, however, is not the most economical as the blowing of the tube is rather slow in comparison to the polymerization speeds attainable. It has proved more satisfactory to form the tubular structure by welding together the edges of one or two preformed weldable synthetic resin strips and shortly after formation of the tubular structure introducing the material to be polymerized, for example, through a tube extending into the interior thereof. Instead of using the welding technique, the tubular structure can also be formed from a strip or several strips by closure with the aid of clamps, sewing, or an adhesive or an adhesive strip.

The accompanying drawing diagrammatically shows an apparatus suitable for carrying out the process according to the invention.

With reference to such drawing, separate portions of the material to be polymerized are supplied from storage containers 1 over conduits 2 provided with regulating valves 3 to common conduit 4 where they are mixed. Each portion of the material to be polymerized, for example, contains a different component or components of a complete catalyst system, for instance, one can contain the oxidizing component and the other the reducing component of a redox catalyst system. Two continuous strips of polyethylene films from rolls 5 run off continuously over guiding elements 6 and through welding elements 7 which serve to weld together the edges of the two polyethylene strips to form a tube. As soon as the tube is formed, the polymerizable mixture is introduced into such tube at a sufficient rate that the tube is completely filled therewith and therefore is free of air. The filled tube is passed with the aid of guide elements 6 continuously through liquid bath 8 which is maintained at the polymerization temperature and, if desired, thereafter through a tempering chamber 9. Thereafter the tubular casing is cut open with knives 10 and the polymer 11 removed therefrom. The opened tubular casing is continuously moved on by roller 12.

Similarly, instead of welding together two polyethylene strips to form the tubular casing, a preformed tubular casing can be employed which is slit open on one side to permit continuous introduction of the material to be polymerized and after such introduction reclosed, for example, by welding. When the preformed tubular casing was rolled up, as usually would be the case, substantially all of the air would have been displaced therefrom so that the use of a protective gas during introduction of the material to be polymerized is unnecessary and other measures for displacing the air are not required.

The following examples will serve to illustrate the process according to the invention.

Example 1

(a) Syrup preparation.—A 2 liter 3 necked flask provided with a reflux condenser and a stirrer was placed in a water bath at 80° C. and 1000 g. of methyl methacrylate, 2.4 g. (0.24%) of n-octyl mercaptan and 2 g. (0.2%) of lauroyl peroxide placed therein. The mixture was then stirred slowly (about 150 r.p.m.) while maintaining the bath temperature of 80° C. for 50 minutes. Thereupon the polymerization was interrupted by cooling the mixture to 20° C. The resulting syrup had a 30% polymer content. The intrinsic viscosity of the polymers precipitated therefrom was 0.35 which corresponds to a molecular weight of about 100,000.

(b) Bulk polymerization.—900 g. of the syrup were mixed with 0.9 g. (0.1%) of n-octyl mercaptan and 3.6 g. (0.4%) of lauroyl peroxide and there degasified under vacuum and cast between two strips of polyethylene film, which had been welded together to form a tube, in such a way that the thickness of the cross-section was 4–5 mm. The thus encased syrup was then passed into a water bath maintained at 75° C. The polymerization was ended after 30 to 45 minutes. After being taken out from the water bath the encased polymer was tempered for 30 minutes in a heating chamber maintained at 110° C. After such tempering the polyethylene film was slit open and removed and the bulk polymer comminuted in a mill.

The resulting polymer had the following properties:

| | |
|---|---|
| Intrinsic viscosity (100 cm.$^3$/g.) | 0.36 |
| Melting index (g./10 min.) 190° C., 20 kg. | 1.5 |
| Vicat (° C.) | 115 |
| Injection molding temperature (15 sec.) (° C.) | 215 |

The polymer was injection molded to form small cups and standard small rods which had the following properties:

| | |
|---|---|
| Bending strength (kg./cm.$^2$) | 1250 |
| Impact strength (cm. kg./cm.$^2$) | 12 |

Example 2

(a) Syrup preparation.—As described in Example 1, 0.15 g. (0.1%) of lauroyl peroxide was added to 150 g. of n-butyl methacrylate and such mixture polymerized to a 30% syrup in 50 minutes at 80° C.

(b) Bulk polymerization.—0.35 g. (0.3%) of lauroyl peroxide was added to 120 g. of the syrup and the mixture introduced into a polyethylene tube 1.5 cm. in diameter. When such filled tube was introduced into a water bath at 75° C. the polymerization was effected in 35 minutes. The encased polymer was then tempered for 30 minutes at 110° C. The polyethylene tube was easily pulled off of the tempered polymeric product.

Example 3

(a) Syrup preparation.—As described in Example 1, 0.3 g. (0.2%) of lauroyl peroxide was added to 150 g. of n-ethyl methacrylate and such mixture polymerized at 80° C. (water bath temperature) in a 250 cc. three necked flask in 90 minutes to a 36% syrup.

(b) Bulk polymerization.—0.16 g. (0.4%) of lauroyl peroxide was added to 40 g. of such syrup and the mixture introduced into a polyethylene tube 5 mm. in diameter. When such filled tube was introduced into a water bath at 75° C. the polymerization was effected in 40 minutes. The polyethylene tube was easily pulled off of the polymer.

Example 4

(a) Syrup preparation.—As described in Example 1, 0.3 g. (0.2%) of lauroyl peroxide were added to 150 g. of vinyl acetate and such mixture polymerized to a syrup at a water bath temperature of 68° C. in 35 minutes.

(b) Bulk polymerization.—0.05 g. (0.1%) of lauroyl peroxide were dissolved in 50 g. of the syrup and the mixture introduced into a polyethylene tube 8 mm. in diameter. When such filled tube was introduced into a water bath at 67° C. the polymerization was effected in 30–40 minutes. The polyethylene tube was easily pulled off of the polymer.

Example 5

(a) Syrup preparation.—2.2 g. (0.22%) of n-octyl mercaptan and 2 g. (0.2%) of lauroyl peroxide were dissolved in a mixture of 950 g. (95%) of methyl methacrylate and 50 g. (5%) of n-butyl acrylate and such mixture polymerized to a 32% syrup at a bath temperature of 80° C. in 50 minutes. The intrinsic viscosity was 0.38.

(b) Bulk polymerization.—900 g. of the syrup to which 0.9 g. (0.1%) of n-octyl mercaptan and 3.6 g. (0.4%) of lauroyl peroxide had been added were introduced into a polyethylene tube 5 mm. in diameter and such filled tube introduced into a water bath at 75° C. for 40 minutes to effect polymerization. The encased polymer was tempered at 110° C. The polyethylene tube was easily pulled off from the polymerized product. It was pulverized and employed for injection molding.

The polymer had the following properties:

| | |
|---|---|
| Intrinsic viscosity (g./100 cm.$^3$) | [1] 0.35 |
| Melting index, (g./10 min.) 190° C., 20 kg. | 4.8 |
| Vicat, (° C.) | 105 |
| Injection molding temperature (° C.), 10 sec. | 220 |

[1] MW~100,000.

The injection molded products had the following properties:

| | |
|---|---|
| Bending strength, (kg./cm.$^2$) | 1190 |
| Impact strength (cm. kg./cm.$^2$) | 13.5 |

Example 6

(a) Syrup preparation.—2.2 g. (0.22%) of n-octyl mercaptan and 2 g. (0.2%) of lauroyl peroxide were dissolved in a mixture of 925 g. (92.5%) of methyl methacrylate and 75 g. (7.5%) of n-butyl acrylate and such mixture polymerized to a 39% syrup at a bath temperature of 80° C. in 50 minutes. The intrinsic viscosity was 0.40.

(b) Bulk polymerization.—900 g. of the syrup to which 0.9 g. (0.1%) of n-octyl mercaptan and 3.6 g. (0.4%) of lauroyl peroxide had been added were introduced into a polyethylene tube 5 mm. in diameter and such filled tube introduced into a water bath at 75° C. for 40 minutes to effect polymerization. The polyethylene tube was easily pulled off from the polymerized product. It was pulverized and employed for injection molding.

The polymer had the following properties:

| | |
|---|---|
| Intrinsic viscosity, (g./100 cm.$^3$) | 0.36 |
| Melting index, (g./10 min.) 190° C., 20 kg. | 5.9 |
| Vicat, (° C.) | 100 |
| Injection molding temperature, (° C.) | 220 |

The injection molded products had the following properties:

| | |
|---|---|
| Bending strength (kg./cm.$^2$) | 1200 |
| Impact strength (cm. kg./cm.$^2$) | 13.5 |

Example 7

(a) Syrup preparation.—0.5 g. (0.05%) of lauroyl peroxide were added to a mixture of 800 g. (80%) of methyl methacrylate and 200 g. (20%) of n-butyl methacrylate and such mixture polymerized at 80° C. in 67 minutes to a 30% syrup.

(b) Bulk polymerization.—0.5 g. (0.05%) of lauroyl peroxide were added to 1000 g. of the syrup and such syrup introduced between two polyethylene strips, the edges of which were sealed together. The thickness of the syrup between the strips was 5 mm. The thus encased syrup was polymerized in a water bath at 75° C. for 45 minutes. Thereafter the polymer was tempered at 110° C. for 35 minutes. The polyethylene strips were easily pulled off from the polymer. The intrinsic viscosity thereof was 2.86.

The polymer was ground in 2 steps in two different mills to a fine powder (<200μ, 91%).

Example 8

(a) Syrup preparation.—As described in Example 1, 1.6 g. (0.2%) of lauroyl peroxide and 0.16 g. (0.2%) of n-octyl mercaptan were dissolved in 720 g. (90%) of methyl methacrylate and 80 g. (10%) of styrene and the mixture heated in a 1 liter three necked flask to 80° C. on a water bath. After 30 minutes the water bath temperature was raised to 90° C. so that after about another 50 minutes the final viscosity was attained (about a 30% syrup).

(b) Bulk polymerization.—A mixture of 50 g. of the syrup and 0.2 g. (0.4%) of lauroyl peroxide was polymerized within a polyethylene tube in a water bath at 80° C. in 30 minutes. The polyethylene tube was easily removed from the polymeric product.

Example 9

(a) Syrup preparation.—1.6 g. (0.2%) of n-octyl mercaptan and 0.8 g. (0.1%) of lauroyl peroxide were added to 788 g. (98.5%) of methyl methacrylate and 12 g. (1.5%) of α methyl styrene and such mixture polymerized to a syrup, as described in Example 1, in a three necked flask in 45 minutes at a bath temperature of 80° C.

(b) Bulk polymerization.—0.1 g. (0.2%) of lauroyl peroxide and 0.05 g. (0.1%) of n-octyl mercaptan were added to 50 g. of the syrup and such mixture polymerized within a polyethylene tube 5 mm. in diameter in a water bath at 65° C. in 40 minutes. The polymer was easily separated from the polyethylene tubes.

Example 10

(a) Syrup preparation.—792 g. (99%) of ethyl acrylate and 8 g. (1%) of α methyl styrene were heated together with 0.8 g. (0.1%) of lauroyl peroxide and 1.6 g. (0.2%) of n-octyl mercaptan in a 1 liter three necked flask for 50 minutes in a water bath at 80° C. The polymerization of the syrup was stopped by cooling to room temperature.

(b) Bulk polymerization.—0.05 g. (0.1%) of lauroyl peroxide and 0.1 g. (0.2%) of n-octyl mercaptan were dissolved in 50 g. of the syrup. The syrup in a thickness of 5 mm. sealed between two sealed polyethylene sheets was polymerized for 30–40 minutes in a water bath at 80° C.

Example 11

(a) Syrup preparation.—0.8 g. (0.1%) of lauroyl peroxide and 1.6 g. (0.2%) of n-octyl mercaptan were dissolved in a mixture of 792 g. (99%) of butyl acrylate and 8 g. (1%) of α methyl styrene and such monomeric mixture polymerized in a water bath at 80° C. to a syrup in 30 minutes.

(b) Bulk polymerization.—0.1 g. (0.2%) of lauroyl peroxide and 0.05 g. (0.1%) of n-octyl mercaptan were added to 50 g. of the syrup and such syrup polymerized within a polyethylene tube in a water bath at 70° C. in 30–40 minutes. The polyethylene was easily separated from the polymers.

Example 12

(a) Syrup preparation.—200,000 parts by weight of methyl methacrylate were heated together with 400 parts by weight of benzoyl peroxide and 440 parts by weight of n-octyl mercaptan in a pressure tight stirring vessel to 80° C. in 15 minutes. Thereupon the pressure in the vessel was adjusted to 400 torr and the temperature maintained at 80° C. for 50 minutes. Then the polymerization was short-stopped by rapid cooling to room temperature. The viscosity of the resulting syrup was about 3000 cp.

(b) Bulk polymerization.—200,000 parts by weight of the syrup were mixed with 200 parts by weight of n-octyl mercaptan and 750 parts by weight of benzoyl peroxide and such mixture degasified by application of a vacuum. The degasified syrup was continuously supplied to a polyethylene tube which with the aid of suitable guide rolls was then flattened out to give a strip of rectangular cross-section 6 mm. thick. The thus flattened structure was continuously passed through a water bath maintained at 80° C. so that it remained in such water bath for 40 minutes. Thereafter the polyethylene was stripped away from the resulting polymer and such polymer comminuted on a mill.

We claim:

1. In a method for the continuous bulk polymerization of a polymerizable mass comprising a material selected from the group consisting of polymerizable monomers having a terminal $CH_2=C<$ group and mixtures thereof while excluding molecular oxygen the steps of continuously introducing the polymerizable mass into a tube shaped synthetic resin structure while at least practically completely displacing all air in such tube and continuously passing the thus filled tube through a polymerization zone maintained at the polymerization temperature required for the polymerizable mass until the polymerization has been effected, the filled tube being flattened out substantially during its passage through the polymerization zone.

2. The method of claim 1 in which said synthetic resin is a polyolefin and said polymerization zone is in the form of a liquid bath maintained at the polymerization temperature.

3. The method of claim 2 in which said polyolefin is polyethylene and said polymerizable monomers are selected from the group consisting of the lower alkyl esters of acrylic acid and of methacrylic acid.

4. The method of claim 2 in which the polymerizable mass is a syrup of at least one partially polymerized monomer.

References Cited

UNITED STATES PATENTS

| 2,848,747 | 8/1958 | Dixon | 264—146 |
| 2,121,966 | 6/1938 | Jacobson | 264—166 |
| 2,276,691 | 3/1942 | Gibb | 264—166 |

FOREIGN PATENTS

| 477,364 | 12/1937 | Great Britain. |
| 639,199 | 6/1950 | Great Britain. |

ROBERT E. WHITE, *Primary Examiner.*

G. AUVILLE, *Assistant Examiner.*